(12) United States Patent
Kim et al.

(10) Patent No.: US 8,990,013 B2
(45) Date of Patent: Mar. 24, 2015

(54) METHOD AND APPARATUS FOR DISPLAYING SEARCH ITEM IN PORTABLE TERMINALS

(75) Inventors: Jin Yong Kim, Seoul (KR); Se Jin Kwak, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 385 days.

(21) Appl. No.: 12/838,672

(22) Filed: Jul. 19, 2010

(65) Prior Publication Data
US 2011/0022983 A1 Jan. 27, 2011

(30) Foreign Application Priority Data

Jul. 27, 2009 (KR) .................. 10-2009-0068509

(51) Int. Cl.
*G06F 3/0481* (2013.01)
*G01C 21/36* (2006.01)

(52) U.S. Cl.
CPC ............ *G06F 3/0481* (2013.01); *G01C 21/367* (2013.01); *G06F 2203/04806* (2013.01)
USPC ........... 701/455; 701/400; 701/409; 701/454; 701/457; 701/461; 715/764

(58) Field of Classification Search
None
See application file for complete search history.

(56) References Cited

U.S. PATENT DOCUMENTS

| | | | |
|---|---|---|---|
| 5,568,390 A * | 10/1996 | Hirota et al. ................. | 701/410 |
| 2004/0243307 A1* | 12/2004 | Geelen .......................... | 701/213 |
| 2005/0270311 A1* | 12/2005 | Rasmussen et al. .......... | 345/677 |
| 2005/0278115 A1* | 12/2005 | Okada ........................... | 701/212 |
| 2006/0250834 A1* | 11/2006 | Chinn et al. ................... | 365/63 |
| 2007/0233373 A1* | 10/2007 | Choi et al. .................... | 701/209 |
| 2008/0228388 A1* | 9/2008 | Tauchi et al. ................. | 701/201 |
| 2008/0244020 A1* | 10/2008 | Dolan ........................... | 709/206 |
| 2009/0271105 A1* | 10/2009 | Kindo et al. .................. | 701/201 |

* cited by examiner

*Primary Examiner* — Keith Bloomquist
(74) *Attorney, Agent, or Firm* — Cha & Reiter, LLC

(57) ABSTRACT

A method and apparatus for displaying a search item in a portable terminal is disclosed. When an item (for example, a particular place, a route to a destination place, particular content, etc.), for which the user requests to search, is searched and displayed, the location information regarding the search item can be displayed, in steps, from a wide range (i.e., upper information) to a narrow range (i.e., lower information), thereby the user can intuitively and easily recognize the location of the search item.

23 Claims, 7 Drawing Sheets

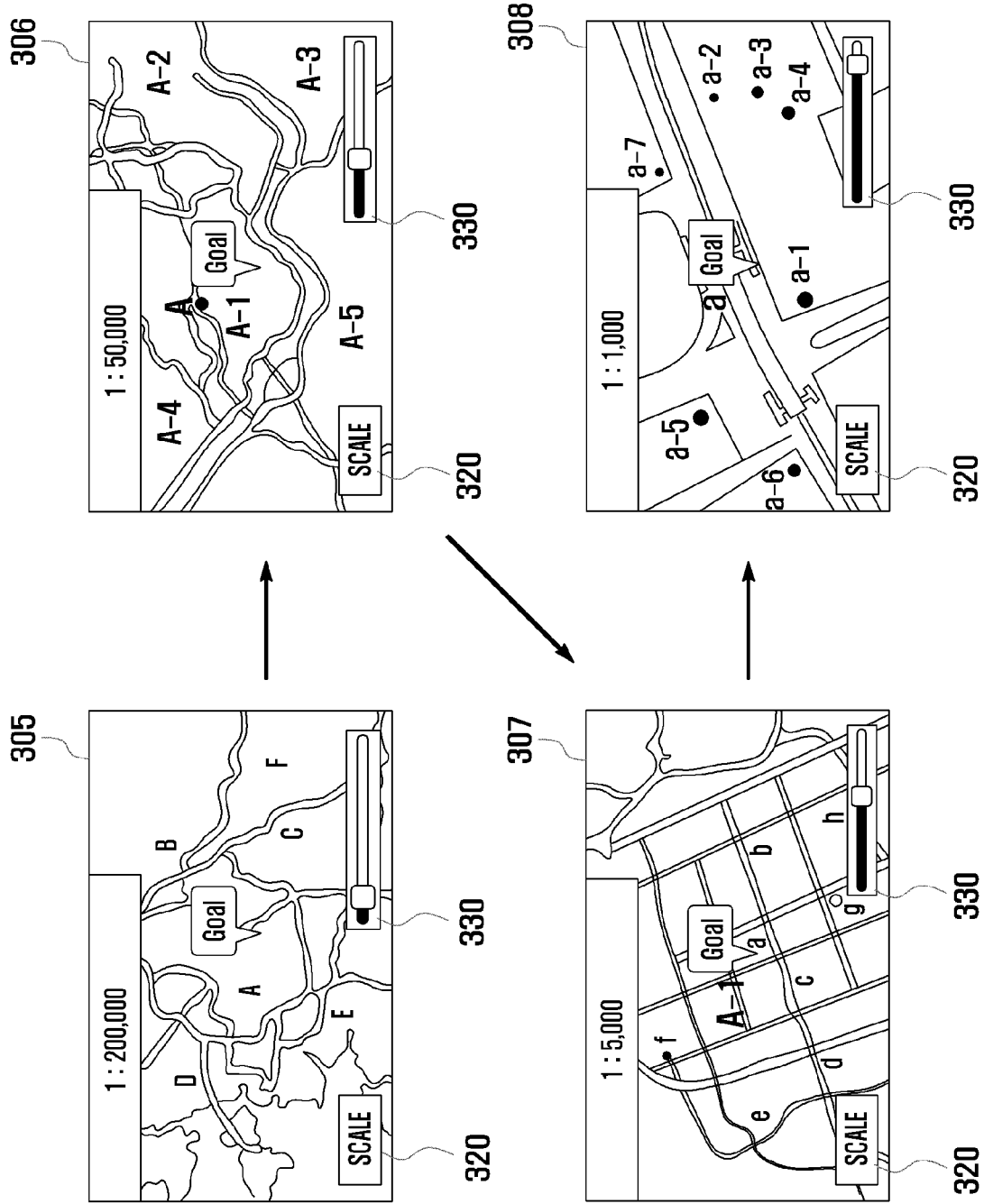

METHOD AND APPARATUS FOR DISPLAYING SEARCH ITEM IN PORTABLE TERMINALS

CLAIM OF PRIORITY

This application claims the benefit under 35 U.S.C. §119(a) of a Korean patent application filed in the Korean Intellectual Property Office on Jul. 27, 2009 and assigned Serial No. 10-2009-0068509, the entire disclosure of which is hereby incorporated by reference.

BACKGROUND OF THE INVENTION

1. Field of the Invention

The present invention relates to communication systems, and more particularly, to a method and apparatus that can display location information regarding a search item, thereby allowing the user to intuitively and easily recognize the schematic location of the search item.

2. Description of the Related Art

In general, portable terminals, for example, a mobile phone, provide a variety of user friendly functions, such as a voice call, text message transmission and reception, digital broadcast reception, audio file playback, etc. In recent years, with a rapid development in GPS technology and portable units, the number of portable terminals employing a location base service (LBS) has increased, such as a route guidance, a friend's location search, information regarding the location closest to a place, for example, a hospital, a bank, etc., and a service for alerting an individual about traffic congestion.

However, conventional portable terminals provides a location base service (LBS) search for a particular place on a map and then display a map centering the particular place in a preset scale. This makes it difficult for the user to easily recognize the schematic location of a particular place, so the user must zoom out of the map. For example, when a user searches for H temple on the map, a map centering H temple according to a preset scale is displayed. If the user does not know the surrounding area where H temple is located, he/she must zoom out of the map to become more familiar with the areas around the H temple. Therefore, a system is needed which reduces the user's inconvenience by allowing to easily and intuitively recognize a schematic location of a particular place.

SUMMARY OF THE INVENTION

The present invention has been made in view of the above problems, and provides a method and apparatus that can allow users to intuitively and easily recognize the location of the search item In accordance with an exemplary embodiment of the present invention, the present invention provides a method for displaying a search item in a portable terminal, including: in response to a request for the search item, identifying location information of the search item and its surrounding information; sorting the identified location information according to a preset rule; and displaying the sorted location information in sequence.

In accordance with another exemplary embodiment of the present invention, the present invention provides an apparatus for displaying a search item in a portable terminal, including: an input unit for receiving a signal for requesting to search an item, where the item contains one of a particular place, a traveling route from a current location to a destination, and a particular content; a controller for identifying location information of the search item and its surrounding information and sorting the identified location information according to a preset rule; and a display unit for displaying the sorted location information in sequence.

BRIEF DESCRIPTION OF THE DRAWINGS

The above and other aspects, features and advantages of certain exemplary embodiments of the present invention will become more apparent from the following description taken in conjunction with the accompanying drawing, in which:

FIG. 3A to FIG. 3C show screens that describe the method shown in FIG. 2;

DETAILED DESCRIPTION OF THE INVENTION

Figure 1:
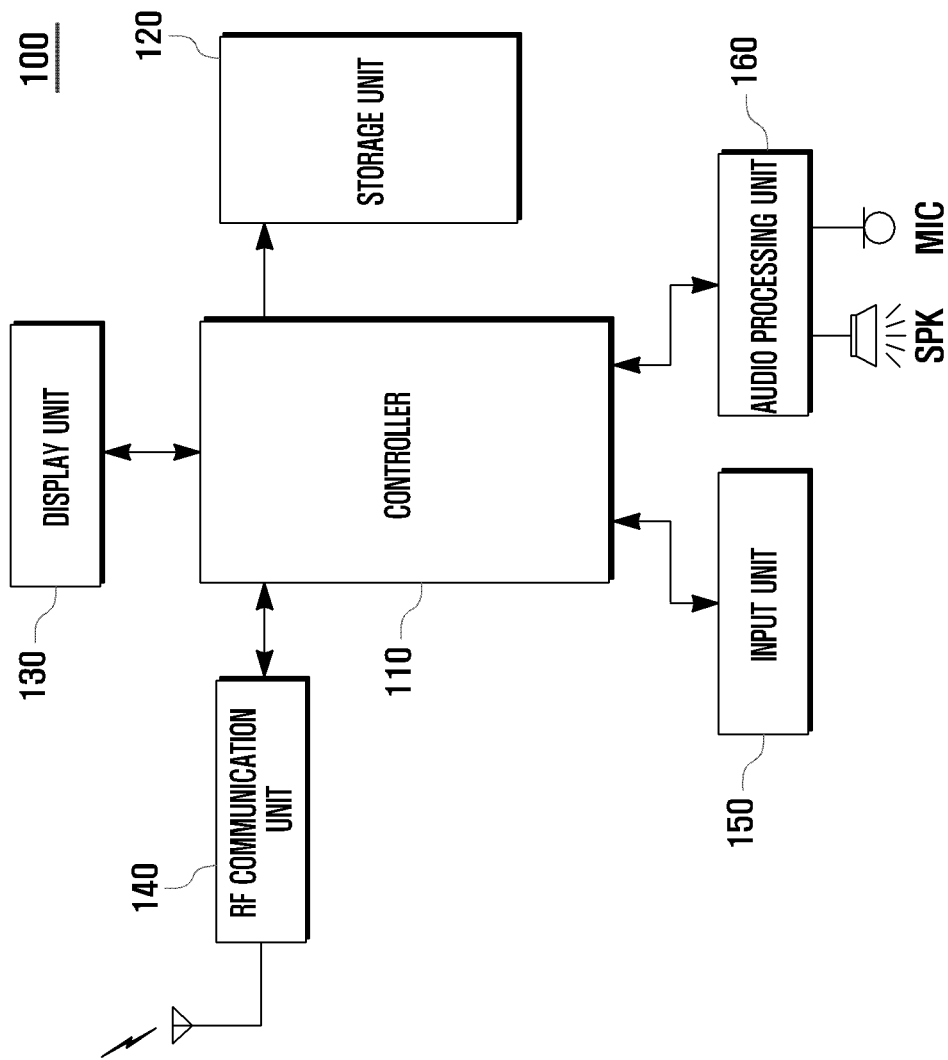
FIG. 1 is a schematic block diagram illustrating a portable terminal according to an embodiment of the present invention.

Hereinafter, exemplary embodiments of the present invention are described in detail with reference to the accompanying drawings. For the purposes of clarity and simplicity, detailed descriptions of well-known functions and structures incorporated herein may be omitted to avoid obscuring the subject matter of the present invention.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

The term, a 'search item,' refers to an item through which a user requests to search location information, for example, a particular place, particular content, a traveling route, etc. The term 'location information' refers to a location of an item and surrounding information to define the location of the item. For example, if the item is a particular place, the location information contains coordinate information regarding the particular place on the map and a display ratio of the map. If the item is a traveling route, the location information contains coordinates of a departure place and a destination place, a traveling route from a departure place and a destination place, and information regarding a plurality of routes determined according to a preset rule. If the item is a particular content, the location information contains a location where the particular content is stored and information regarding a path of the folder where the particular content is stored.

FIG. 1 is a schematic block diagram illustrating a portable terminal according to an embodiment of the present invention.

Referring to FIG. 1, the portable terminal 100 includes an RF communication unit 140, an input unit 150, an audio processing unit 160, a display unit 130, a storage unit 120, and a controller 110.

In the following description, the present invention will be explained, for an illustrative purpose, based on an embodiment where a particular place requested by a user is displayed on a map. That is, the portable terminal 100 according to an embodiment of the present invention can display a particular place on a map, by altering the scale of the map, in sequence/steps, so that the user can intuitively and readily recognize the desired location of the particular place on the map. It should be understood that the present invention is not limited to the embodiment. For example, the present invention can also be implemented in such a way that a request is made to search contents stored in the portable terminal, such as an image file, a document file, etc. That is, when the portable terminal 100 displays a requested content, it can display information regarding a folder path from the highest folder containing the requested content to the lowest folder where the search requested content is located.

Referring to FIG. 1, the RF communication unit 140 establishes a communication channel with a wireless network (including a base station), so that the portable terminal 100 can perform data communication and voice communications with other portable terminals therethrough. The RF communication unit 140 includes an RF transmitter for up-converting the frequency of signals to be transmitted and amplifying the signals and an RF receiver for low-noise amplifying received RF signals and down-converting the frequency of the received RF signals. In the embodiment of the present invention, the RF communication unit 140 is used to download a map or receive updated information regarding the map. The RF communication unit 140 also receives information regarding a current location of the portable terminal 100 from a global positioning system (GPS) satellite or a base station. In particular, the RF communication unit 140 may further include a GPS receiver in order to receive location information from the GPS satellite. The RF communication unit 140 can continuously receive location information according to the movement of the portable terminal 100 and outputs them to the controller 110.

The storage unit 120 stores programs that control the entire operation and a particular function of the portable terminal 100, and data generated when the programs are executed. For example, the storage unit 120 stores an operating system (OS) for booting the portable terminal 100, application programs required to operate the functions of the portable terminal 100, and data generated when the portable terminal 100 is operated. The storage unit 120 is composed of read only memory (ROM), random access memory (RAM), etc. In the embodiment of the present invention, the storage unit 120 stores a map that contains building names, subway station names, address information, etc. The portable terminal 100 can wiredly or wirelessly download or update the map via the RF communication unit 140, a personal computer (PC), etc. In particular, the storage unit 120 stores an application program that can search for a particular place from the map according to a user's search request and display a map showing the location of the particular place by altering the scale of the map in steps. The application program can differently set the scale of the map that is altered in steps according to the display mode. The output mode contains at least one of an address mode for displaying a map, in steps, according to an address identifier, a scale mode for displaying maps, in steps, according to scales by preset steps, and a user mode for displaying maps according to time and distances by preset steps.

The input unit 150 receives numerical or alphabetical information. The input unit 150 includes a plurality of input keys and function keys to set and control a variety of functions of the portable terminal 100. The input unit 150 may be implemented with a touch pad or further include a separate touch pad, according to types of portable terminals. The input unit 150 may also be implemented by one of a touch pad, a touch screen, a keypad of a general key arrangement, a QWERTY keypad, and an input device having function keys for performing particular operations, or a combination thereof. In the embodiment of the present invention, the input unit 150 generates an input signal according to the input of a particular place, for example, a destination, and transfers it to the controller 110. The input unit 150 also generates a signal for enabling a function to display maps by steps, an input signal for moving a map to the previous stage or the following stage, and an input signal for altering a display mode, and transfers them to the controller 110. The input unit 150 can also generate an input signal for optimizing and displaying the map of a route from a current location to a destination in one screen in steps.

The audio processing unit 160 reproduces audio signals or outputs audio signals input via a microphone MIC to the controller 110. That is, the audio processing unit 160 converts analog audio signals input via the microphone MIC into digital audio signals. The audio processing unit 160 also converts digital audio signals into analog audio signals and outputs them to a speaker SPK. The audio processing unit 160 can also output key input sounds, sound effects according to the execution of functions, etc. In the embodiment of the present invention, the audio processing unit 160 can output voice signals for route guidance from the current location to the destination, traffic information, etc.

The display unit 130 displays screen data generated when the portable terminal 100 is operated and project information according to a user's input event, operation, key operation, and function settings. The display unit 130 can also display a variety of signals and color information output from the controller 110. The display unit 130 may be implemented with a liquid crystal display (LCD), an organic light emitting diode (OLED), etc. The display unit 130 is implemented with a touch screen depending on the types of portable terminals. In that case, the display unit 130 may also serve as an input device. In the embodiment of the present invention, the display unit 130 can display a map according to a location search and a route guidance request. In particular, when a request is made to search a location of a particular place, the display unit 130 can display a map of the particular place, by altering the scale of the map, in steps, according to the display mode, under the control of the controller. That is, the display unit 130 can slide and display a plurality of maps in different scales, one by one, for a certain period of time period. This operation will be explained later in detail with reference to FIG. 2 and FIGS. 3A to 3C.

The controller 110 controls the entire operation of the portable terminal 100 and signal flows among the elements in the portable terminal 100. The controller 110 can also process data. In the embodiment of the present invention, when a request is made to search a location of a particular place, the controller 110 can control a function to display maps in steps, where the particular place is searched from a stored map and a map showing the location of the particular place is displayed, by adjusting/altering the scale in steps. When the map showing the location of the particular place is displayed, the controller 110 checks whether a function to display maps in steps is set. If so, the controller 110 can detect the display mode, which contains at least one of an address mode, a scale mode and a user mode. The address mode displays a map, in steps, according to an address identifier. The scale mode displays a map, in steps, according to scales by preset steps. The user mode displays maps according to time and distances by preset steps. The controller 110 can display the map showing the location of the particular place, in steps, corresponding to the display mode. This display process will be explained later in detail with reference to FIG. 2 and FIGS. 3A to 3C.

When a user requests a traveling route to a destination, the controller 110 searches for a traveling route to the destination, calculates an optimum scale to display the traveling route in a single screen, and displays a map showing the traveling route corresponding to the calculated optimum scale. After that, the controller 110 sorts a plurality of traveling routes according to a preset rule and then displays them in steps, so that the user can easily recognize the traveling route to the destination. After that, the controller 110 may further perform a route guidance function for guiding the user along the traveling route to the destination. During the route guidance process, the controller 110 can provide traffic information, for example, speed limit violations, traffic signal violations, traffic congestion, etc. To this end, the controller 110 can continue checking the current location using positioning information received from a satellite or a base station. This process will be explained later in detail with reference to FIGS. 4 and 5.

If a map has been displayed, in steps, according to a display mode, when a request is made to search a particular place, the controller 110 can display a map showing the location of the particular place in a preset scale. On the contrary, if a map has been displayed, in steps, during the route guidance process, the controller 110 can display a map showing the current location in a preset scale.

Although the portable terminal of the present invention has been explained based on the embodiment as shown in FIG. 1, it should be understood that the present invention is not limited to the shown embodiment. For example, the portable terminal 100 may be configured to selectively further include units having add-on functions which may include: a camera module for capturing images or moving images; a short-range communication module for short-range wireless communication; a broadcast receiving module for receiving broadcasts; a digital audio source reproducing module, such as an MP3 player module; and an Internet communication module for performing communication via the Internet. With the spread of digital convergence, although there are too many varieties of portable terminals to list their modifications in this description, it will be easily appreciated to those skilled in the art that the other units equivalent to the above-listed units may be further included to the portable terminal 100 according to the present invention.

With reference to FIG. 2 and FIGS. 3A to 3C, methods for displaying a search item are explained based on cases where a particular place is searched and a route from a current place to a destination is searched.

Figure 2:
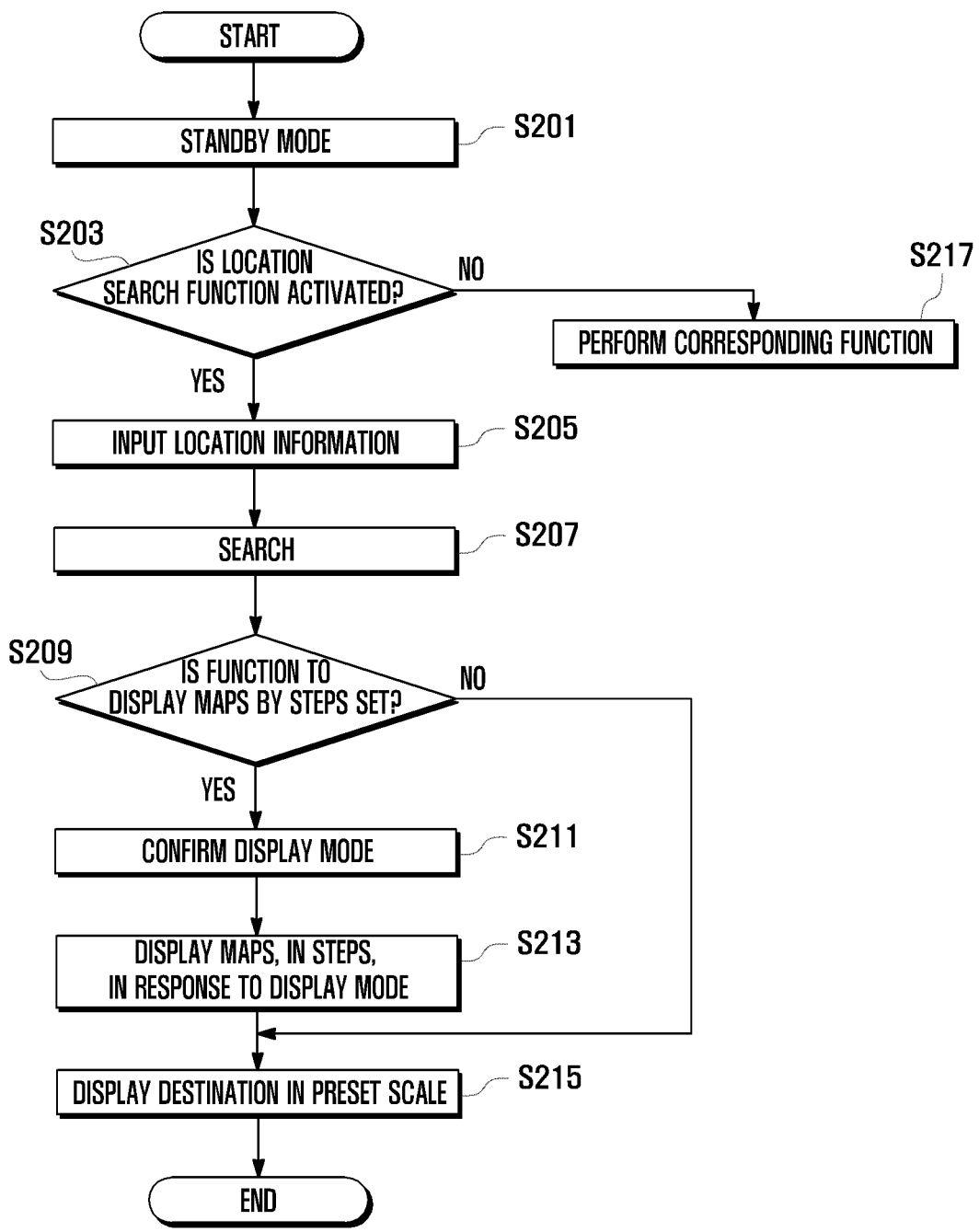
FIG. 2 is a flow chart that describes a method for displaying a search item when a particular place is searched according to an embodiment of the present invention.
Figure 3A:
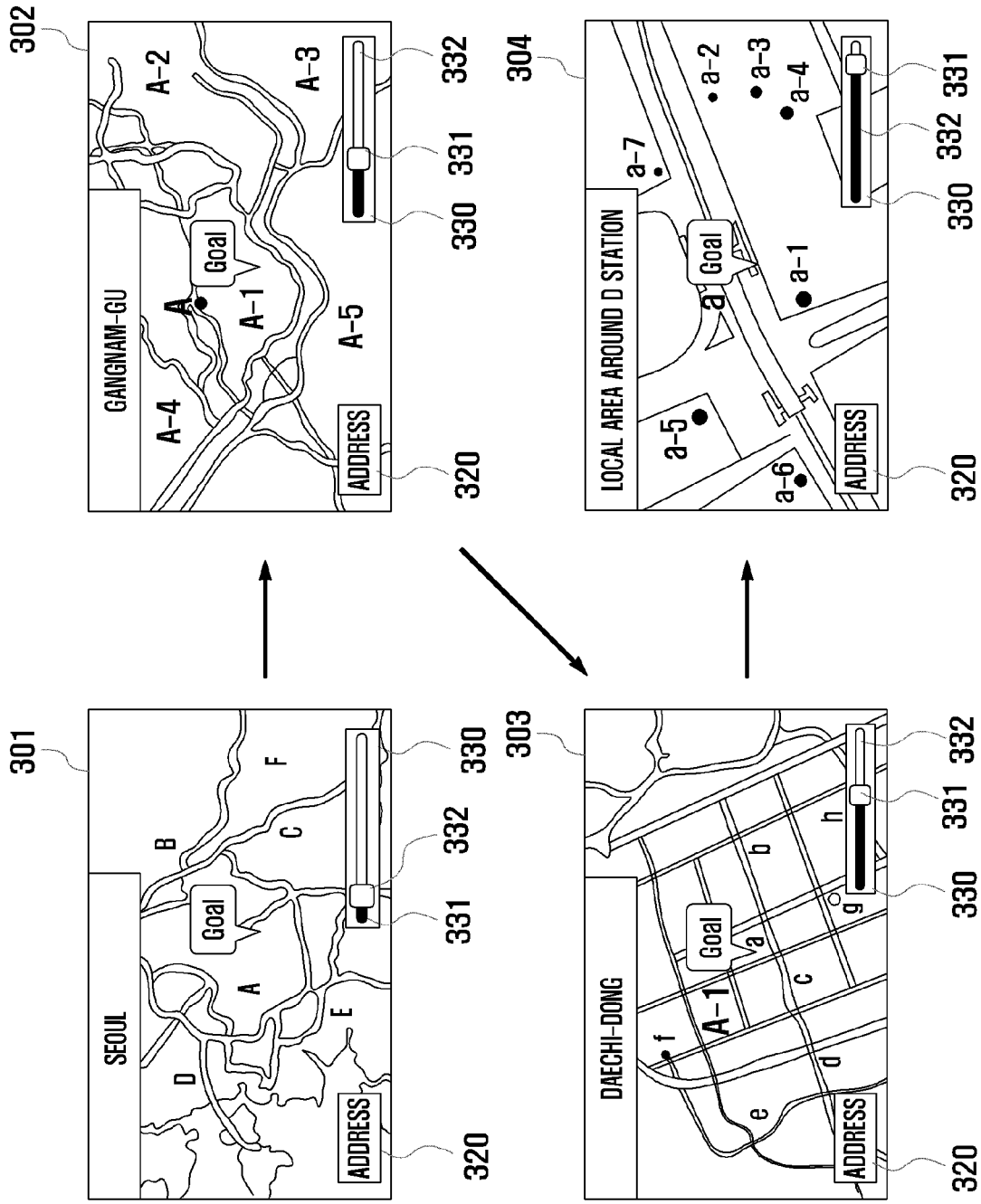
Figure 3C:
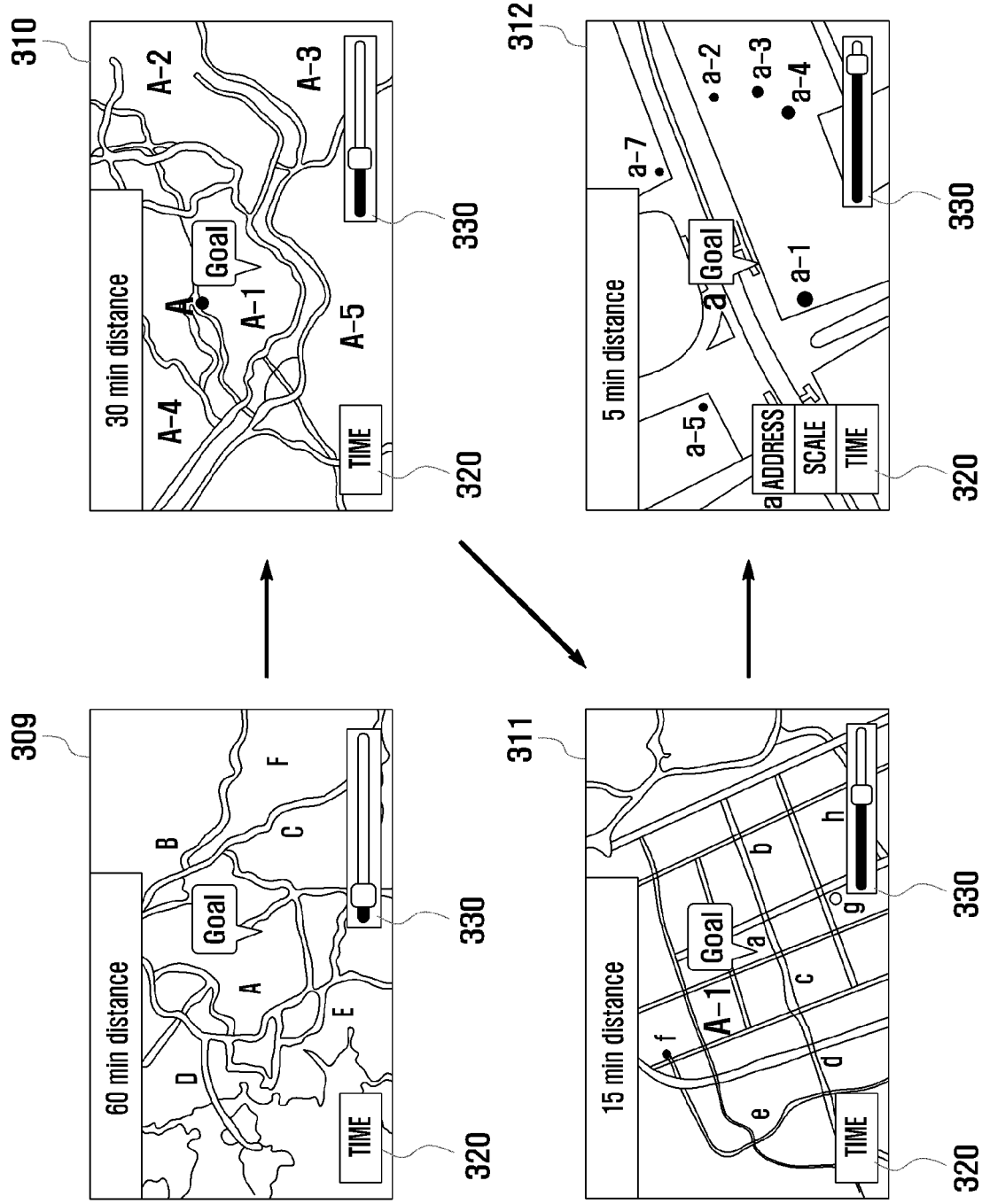

FIG. 2 is a flow chart illustrating a method for displaying a search item when a particular place is searched according to an embodiment of the present invention. FIG. 3A to FIG. 3C show screens that describe the method of FIG. 2.

Referring to FIG. 2, in a standby mode (S201), If the portable terminal 100 is equipped with a navigation terminal, the standby mode refers to a state where a current location is being displayed on the screen by a predefined scale. If the portable terminal 100 is a mobile communication terminal, a PDA, etc., which is provided with a navigation function, the standby mode refers to a state where an idle screen is being displayed.

The controller 110 checks whether a location search function is activated (S203). If the controller 110 ascertains that a location search function is not activated but instead the other functions are activated at S203, it performs a corresponding function (S217), such as a file playback function, a file search function, a call connection function, a call reception function, etc.

If a location search function is activated at S203, the controller 110 receives location information of a particular place to be searched (hereinafter called a destination), via the input unit 150 (S205). That is, a user can input a name of a particular building, an address, a name of a subway station, etc. in the input unit 150. After the controller receives the destination information at S205, it searches for the destination on the map (S207). The map is stored in the portable terminal 100 and contains names of major landmarks, road names, names of subway stations, address information, positioning information, etc.

After that, the controller 110 checks whether a function to display maps by steps is set (S209). If the controller 110 ascertains that a function to display maps by steps is set at S209, it identifies a display mode (S211). The display mode contains at least one of an address mode for displaying a map, in steps, according to an address identifier, a scale mode for displaying maps, in steps, according to scales by preset steps, and a user mode for displaying maps according to time and distances by preset steps.

The controller 110 displays a map, in steps, by altering the scales of the map gradually according to the type of display mode (S213). The process is explained in detail with reference to FIGS. 3A to 3C. If the display mode is an address mode and the user searches D station, the controller 110 checks address information regarding D station and then displays the entire map of Seoul corresponding to the highest address identifier as shown in screen 301 in FIG. 3A, the whole map of Gangnam-gu, for example, corresponding to the second higher address identifier as shown in screen 302, the whole map of Daechi-dong, a next higher address identifier, as shown in screen 303, and finally the map showing a local area containing D station as shown in screen 304, sequentially for a certain period of time. That is, the display unit 130 can scale down the map based on the address information regarding the particular place, i.e., zoom-in on the map. Through this process, the user easily and intuitively recognizes that D station is located in Daechi-dong, Gangnam-gu, Seoul, without checking the address information of D station and zooming in on the map.

Although the map displaying process has been explained based on a city serving as the highest address identifier as shown in FIG. 3A, it should be understood that the present invention is not limited to the embodiment. For example, it can also be achieved in such a way that a country can be set as the highest address identifier. Hence, the address identifier can be variously set according to the address system by countries, respectively.

Additionally, the highest address identifier can be set by comparing address information regarding a current location with address information regarding a search requested place. For example, if the address information of the current location is "Y station, Yeoksam-dong, Gangnam-gu, Seoul" and the address information of the search requested place is "S station, Samsung-dong, Gangnam-gu, Seoul", the highest address identifier can be 'Gangnam-gu' corresponding to the same last address identifier from the address information between the current location and the search request place. In that case, the controller 110 can zoom-in and display, sequentially, the whole map of Gangnam-gu, the whole map of Samsung-dong, and the map of the local area around S station.

If the display mode is a scale mode, the controller 110 can display a map showing the location of the particular place, in steps, by scaling down the map drawn to a scale of 1:200,000 as shown in screen 305 of FIG. 3B, of 1:50,000 as shown in screen 306 of FIG. 3B, of 1:5,000 as shown in screen 307 of FIG. 3B, and of 1:1,000 as shown in screen 308 of FIG. 3B. It should be understood that the present invention is not limited by scales according to steps. That is, scales according to steps may be variously set by the manufacturer or the user.

If the display mode is a user mode, the controller 110 can display, in steps, a map showing the particular place and an area reached within 1 hour therefrom as shown in screen 309 of FIG. 3C, a map showing the particular place and an area reached within 30 minutes therefrom as shown in screen 310 of FIG. 3C, a map showing the particular place and an area reached within 15 minutes therefrom as shown in screen 311 of FIG. 3C, and a map showing the particular place and an area reached within 5 minutes therefrom as shown in screen 312 of FIG. 3C. It should be understood that the present invention is not limited by the time interval. That is, the time interval may be variously set by the manufacturer's purposes. The time interval may also be selectively set via a menu by the user.

The controller 110 can set the time interval according to the number of steps for displaying the map. For example, if the traveling time from the current location to a destination is six hours and the map is set to display the route in six steps, the controller 110 zooms in and displays, in steps, the map based on a one-hour interval. Likewise, if the traveling time from the current location to a destination is six hours and the map is set to display the route in three steps, the controller 110 zooms in and displays, in steps, the map based on a two-hour interval. To this end, the storage unit 120 can store traveling distances by times according to a means of transportation. The controller 110 can calculate the traveling time from a current location to a destination, and display, in steps, sequentially, a map showing the destination and an area reached within the calculated traveling time from the destination, a map showing the destination and an area reached within 50% of the calculated traveling time, and a map showing the destination and an area reached within 25% of the calculated traveling time. That is, the controller 110 can zoom in and display a map by reducing the time for a previous stage of the map by half. The controller 110 can repeat the process described above until a map showing an area reached within a preset time, for example, less than 5 minutes, is displayed. Although the embodiment of the present invention as shown in FIG. 3C has been explained in such a way that the map is zoomed in and displayed, in steps, by scaling down the map with respect to time, it should be understood that the present invention is not limited to the embodiment. For example, the present invention can also be implemented in such a way that the map is, in steps, displayed by scaling down the map with respect to distance.

Meanwhile, on one side of screens 301 to 312, a menu bar 330 for moving maps between steps can be displayed The menu bar 330 is comprised of a bar 332 corresponding to the entire step and a slide bar 331 that may be moved on the bar 332 and represents a current step where it is stopped. If the display unit 130 is implemented with a touch screen, the slide bar 331 can be dragged with the user's finger or moved by directional keys, so that the map according to a user's desired scale can be displayed. The display unit 130 can further display a mode alteration menu 320 for altering the display mode. Although the mode alteration menu 320 is implemented in a pop-up manner that shows menu items in list, it can also be achieved by various methods, for example, a toggling mode for sequentially altering preset menu items in response to a touch, a spinning mode for turning items according to the input of a touch or a directional key signal, etc. The mode alteration menu 320 and the menu bar 330 may be implemented with a soft key, a touch key, etc.

Although the embodiment as shown in FIGS. 3A to 3C has been explained in such a way that the map is zoomed in and displayed by scaling down the map, it should be understood that the present invention is not limited to the embodiment. For example, the present invention can also be implemented in such a way that a map showing a particular place is displayed in a certain scale according to a request to search a location of the particular place, and then zoomed-out and displayed, in steps, by scaling up the map.

After the map has been displayed in steps at S213, the controller 110 displays the destination in a preset scale (S215). The preset scale may be the scale of the map that was last displayed at step S231. On the contrary, if the controller 110 ascertains that a function to display maps by steps is not set at S209, it can display a map showing the location of the destination in a preset scale at S215.

As described above, when a request is made to search for a location of a particular place, the present invention can display, in steps, a map showing the location of the particular place by scaling the map, so that the user can easily recognize a schematic location of the particular place.

Figure 4:
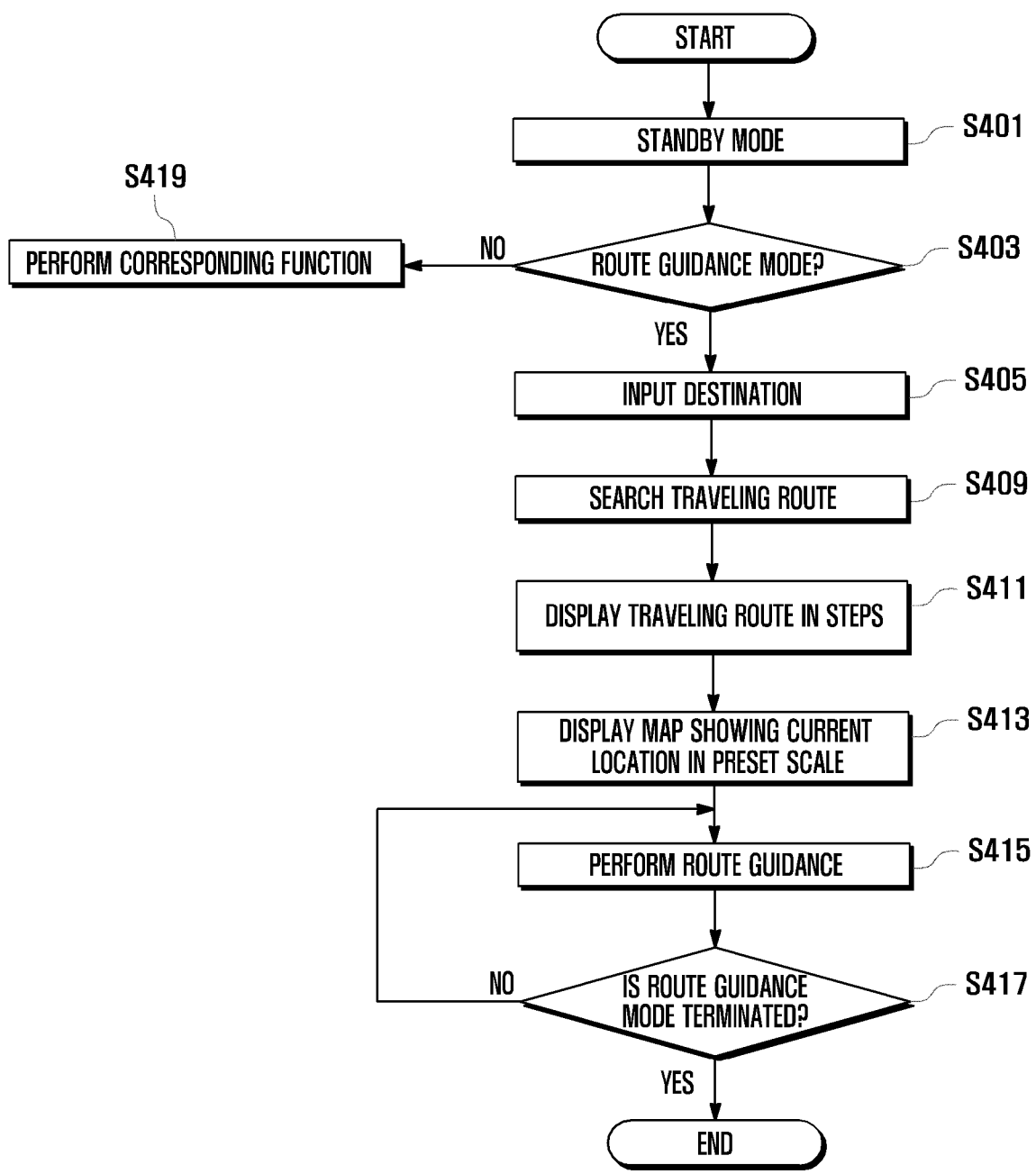
FIG. 4 is a flow chart that describes a method for displaying a search item when a route is searched according to an embodiment of the present invention.
Figure 5:
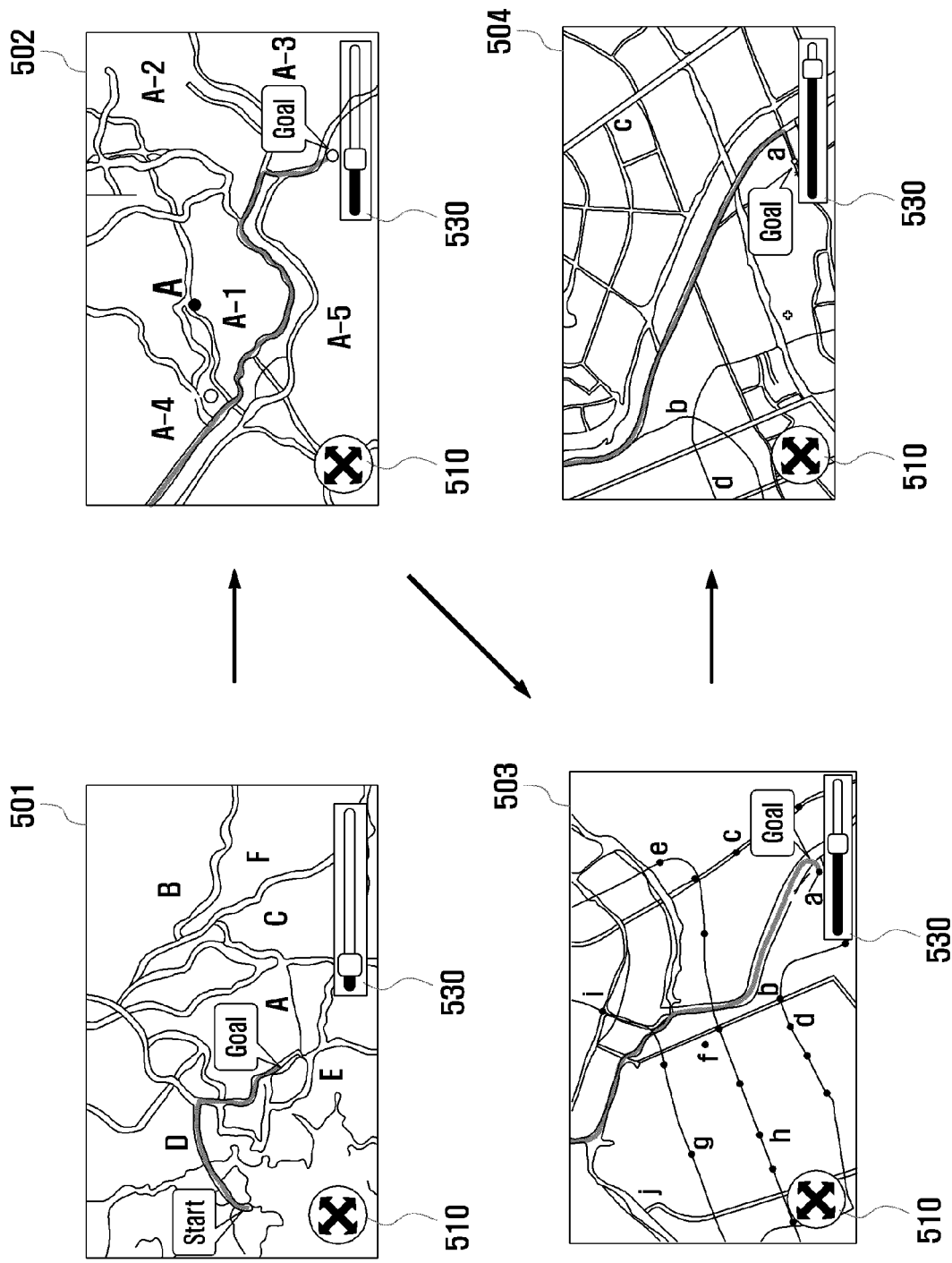
FIG. 5 shows screens that describe the method shown in FIG. 4.

FIG. 4 is a flow chart that describes a method for displaying a search item when a route from a current location to a destination is searched, according to an embodiment of the present invention. FIG. 5 shows screens that describe the method of FIG. 4.

Referring to FIGS. 1, 4, and 5, in a standby mode (S401), If the portable terminal 100 is a navigation terminal, the standby mode refers to a state where a current location is being displayed on the screen with a certain scale. If the portable terminal 100 is a mobile communication terminal, a PDA, a personal computer, etc., which is provided with a navigation function, the standby mode refers to a state where an idle screen is being displayed.

The controller 110 checks whether a route guidance mode is enabled (S403). If the controller 110 ascertains that a route guidance mode is not enabled at S403, it performs a corresponding function according to a user's request (S419). Examples of the corresponding functions may be a file playback function, a file search function, a call connection function, a call reception function, etc. On the contrary, if the controller 110 ascertains that a route guidance mode is enabled at S403, it receives a destination information (S405). The controller 110 searches for a route from a current location to a destination (which is hereinafter called a traveling route) (S409). In the embodiment of the present invention, the method for displaying a search item may further include a step of setting an intermediate point before searching a route, according to a user's selection. In that case, the controller 110 can search for the traveling route containing the intermediate point at S409.

The controller 110 displays, in steps, the traveling route (S411). The controller 110 calculates the optimum scale of the map to display the traveling route on entire screen and then displays a map containing the traveling route in the calculated optimum scale. After that, the controller 110 sorts the traveling route into a plurality of routes according to a predefined protocol and then displays the sorted routes, in steps, which is described with reference to FIG. 5. As shown on screen 501 of FIG. 5, the controller 110 has searched the traveling route and displays the map containing the traveling route, in the calculated optimum scale, on the display unit 130. After a certain period of time has elapsed, the display unit 130 displays a map containing the traveling route where 50% of the distance has been traveled to the destination, as shown on screen 502 of FIG. 5. Next, the display unit 130 displays a map containing the traveling route where 75% of the distance has been traveled to the destination, as shown on screen 503 of FIG. 5. Last, the display unit 130 displays a map containing the traveling route where 90% of the distance has been traveled to the destination, as shown on screen 504 of FIG. 5. That is, when the total traveling route is first displayed by a map with a scale of 100, the display unit 130 can display traveling routes in maps with scales of 50~100, 75~100, and 90~100, sequentially, for a certain period of time. It should be understood that the present invention is not limited to the map with the scales described above. For example, the present invention can sort the traveling route into a plurality of routes having a certain size and then display the sorted routes sequentially. The controller 110 can divide the traveling route shown in a map with a scale of 100 into four steps: 0< a map with a scale ≤25, 25< a map with a scale ≤50, 50< a map with a scale ≤75, and 75< a map with a scale ≤100. After that, the controller 110 can display the maps in four steps sequentially. It should be understood that the present invention is not limited by the number of divided traveling routes. The number of divided traveling routes may be set differently by the manufacturer or the user.

On one side of the display unit 130, a route display menu 510 is displayed to activate a function for displaying maps according to steps. The user can activate the function for displaying routes according to steps via the route display menu 510, during the route guidance, so that he/she can easily recognize the remaining route to the destination during the traveling process. The route display menu 510 may be implemented with a soft key, a touch key, etc. The display unit 130 can also display the menu bar 530 shown in FIGS. 3A to 3C, on one side of the screen.

After displaying the maps by steps, the controller 110 displays the current location on the map in a preset scale (S413), and then performs a route guidance function (S415). After that, the controller 110 checks whether the route guidance mode is terminated (S417). If the controller 110 ascertains that the route guidance mode is terminated at S417, it terminates the route guidance. On the contrary, if the controller 110 ascertains that the route guidance mode is not terminated at S417, it returns to and proceeds with S415.

As described above, when a request is made to search for a traveling route to a destination, the present invention can divide the traveling route into a plurality of routes according to a preset rule and displays them in steps, so that the user can intuitively and rapidly recognize a schematic traveling route.

Although the embodiment of the present invention has been explained as displaying maps, in steps, when a particular place and a traveling route is displayed, it should be understood that the present invention is not limited to the embodiment. For example, the present invention can also be implemented in such a way that a request is made to search contents stored in the portable terminal, such as an image file, a document file, etc. That is, the present invention can search a location of content that the user requested to search and displays information regarding a folder path from the highest folder containing the search requested content to the lowest folder where the search requested content is located, so that the user can intuitively recognize the location where the content is stored. For example, if content that the user requested to search is stored in the path "C:\Window\Test\test.txt," the display unit 130 can sequentially display a folder image showing C drive, a Window folder image, and a Test folder image, in order to show information regarding the folder path of the content. When the Test folder image is displayed, the content 'text.txt' can also be displayed together.

As described above, according to a request to search an item, the present invention performs: checking item location information that contains the location of the item and surrounding information to define the location of the item; and sorting and displaying at least part of the item location information based on a certain rule. The present invention shows, in steps, item location information from the upper information to lower information or vice versa, so that the user can intuitively recognize it.

As described above, since the method and apparatus for displaying a search item, according to the present invention, can display a map containing location information regarding a particular place by scaling the map in the portable terminal, the user can more easily and intuitively recognize the location of the particular place. The method and apparatus for displaying a search item can prevent the zooming in or out operation, which provides user convenience. The method and apparatus for displaying a search item can display, in steps, location information regarding content from the highest folder to the lowest folder containing the content, so that the user can easily recognize the location where the content is stored.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although the invention has been shown and described with respect to exemplary embodiments thereof, it should be understood that these embodiments are only illustrative and not intended to limit the scope of the invention. Therefore, one skilled in the art will understand that the embodiments disclosed in the description and configurations illustrated in the drawings are only preferred embodiments, instead there may be various modifications, alterations, and equivalents thereof, without departing from the scope and sprit of the invention as described in the accompanying claims.

What is claimed is:

1. A method for displaying a search item in a portable terminal, comprising:
    identifying, in response to a request for the search item, location information of the search item;
    sorting the identified location information according to a preset rule;
    displaying a mode altering menu on a physical display unit, with the mode altering menu displaying options for selecting an address mode and a user mode;
    receiving, through the mode altering menu, a display mode selection input;
    identifying the received display mode selection, wherein, when the selected display mode is the address mode, a physical controller displays a number of maps in a sequence of map scales based on a hierarchy of address identifiers, and wherein, when the selected display mode is the user mode, the physical controller displays a sequence of map scales corresponding to a sequence of travel times, starting from a first map scale of the sequence of map scales showing a radial range of geographic area around the search item, such that the search item is substantially in the center of the radial range of the geographic area, defined by a first travel time of the sequence of travel times, and ending with a last map scale of the sequence of map scales showing the radial range of geographic area around the search item defined by a last travel time of the sequence of travel times, each travel time in each map scale of the sequence being calculated by dividing a total travel time by the number of maps in the sequence; and displaying, by the physical display unit, the sorted location information according to the identified display mode.

2. The method of claim 1, wherein the response to a request for search item comprises one of the following steps:
requesting to search a location of a particular place stored in a map;
requesting to search a traveling route from a current location to a destination; and
requesting to search a location where content is stored.

3. The method of clam 1, wherein displaying the sorted location information in sequence comprises displaying the location information of a particular place in steps by altering the scale of the map.

4. The method of clam 1, wherein the number of maps in the sequence of map scales in the display mode is equal to a preset number of steps.

5. The method of clam 1, further comprising:
displaying the location information in steps by altering the display mode; and/or displaying a map of a previous scale in response to an input signal that alters the scale of the map via a traveling menu or a map of a following scale.

6. The method of claim 3, wherein displaying the location information of the particular place in steps by altering a scale comprises:
scaling the map up by zooming out or down by zooming in steps.

7. The method of clam 1, wherein displaying the sorted location information in steps comprises:
calculating, if the searched traveling route is displayed, an optimum scale that can display the traveling route in one screen;
displaying the traveling route in the optimum scale; and
sorting the traveling route into a plurality of routes according to a preset rule and displaying the sorted plurality of routes in steps.

8. The method of clam 7, further comprising:
displaying a map, where the current location is displayed, in a preset scale.

9. The method of claim 1, wherein displaying the sorted location information in sequence comprises zooming in or out in steps based on a predetermined time interval.

10. The method of claim 1, wherein displaying maps in any sequence of map scales comprises displaying maps beginning with a largest map scale determined by the hierarchy of the address identifiers.

11. The method of claim 1, wherein the hierarchy of address identifiers is being determined in an order of a country, state, city, street, and building number, or in a reverse order thereof.

12. The method of claim 1, wherein the address identifiers include address data fields comprising country, state, city, street, and building number.

13. The method of claim 1, wherein the location information includes a location of the search item and surrounding information.

14. An apparatus for displaying a search item in a portable terminal, comprising:

a physical display unit for displaying a mode altering menu, with the mode altering menu displaying options for selecting an address mode and a user mode;
a physical input unit for physically inputting input data, the search item, and a display mode selection through the mode altering menu; and
a physical controller for identifying location information of the search item, sorting the identified location information according to a preset rule, and identifying the selected display mode, wherein, when the selected display mode is the address mode, the physical controller displays a number of maps in a sequence of map scales based on a hierarchy of address identifiers, and wherein, when the selected display mode is the user mode, the physical controller controls display of a sequence of map scales corresponding to a sequence of travel times, starting from a first map scale of the sequence of map scales showing a radial range of geographic area around the search item, such that the search item is substantially in the center of the radial range of the geographic area, defined by a first travel time of the sequence of travel times, and ending with a last map scale of the sequence of map scales showing the radial range of geographic area around the search item defined by a last travel time of the sequence of travel times, each travel time in each map scale of the sequence being calculated by dividing a total travel time by the number of maps in the sequence
wherein the physical display unit displays the sorted location information according to the identified display mode.

15. The apparatus of claim 14, wherein the physical controller sorts location information regarding a particular place according to the display mode, the number of maps in the sequence of map scales in the display mode being equal to a preset number of steps.

16. The apparatus of claim 15, wherein the physical controller scales the map up by zooming out or down by zooming in steps.

17. The apparatus of claim 14, wherein the display unit comprises a traveling menu for moving the map in a previous scale or a following scale.

18. The apparatus of claim 14, wherein the physical controller calculates, if a search for a traveling route is requested, an optimum scale that can display the traveling route in one screen, displays the traveling route in the optimum scale, sorts the traveling route into a plurality of routes according to a preset rule, and displays the sorted routes in steps.

19. The apparatus of claim 14, wherein the display unit displays the sorted location information by zooming in or out in steps based on a predetermined time interval.

20. The apparatus of claim 14, wherein displaying maps in any sequence of map scales comprises displaying maps beginning with a largest map scale determined by the hierarchy of the address identifiers.

21. The apparatus of claim 14, wherein the hierarchy of address identifiers is being determined in an order of a country, state, city, street, and building number, or in a reverse order thereof.

22. The apparatus of claim 14, wherein the address identifiers include address data fields comprising country, state, city, street, and building number.

23. The apparatus of claim 14, wherein the search item corresponds to at least one of a place, a travel route from a current location to a destination, and a content.

* * * * *

UNITED STATES PATENT AND TRADEMARK OFFICE
CERTIFICATE OF CORRECTION

PATENT NO.         : 8,990,013 B2
APPLICATION NO.    : 12/838672
DATED              : March 24, 2015
INVENTOR(S)        : Jin Yong Kim et al.

It is certified that error appears in the above-identified patent and that said Letters Patent is hereby corrected as shown below:

In the Claims,

Column 11, Claim 3, Line 19 should read as follows:
--...claim 1, wherein displaying...--

Column 11, Claim 4, Line 23 should read as follows:
--...claim 1, wherein the...--

Column 11, Claim 5, Line 26 should read as follows:
--...claim 1, further comprising...--

Column 11, Claim 7, Line 37 should read as follows:
--...claim 1, wherein displaying...--

Column 11, Claim 8, Line 46 should read as follows:
--...claim 7, further comprising...--

Column 11, Claim 8, Line 47 should read as follows:
--...where a current location...--

Signed and Sealed this
Seventh Day of July, 2015

Michelle K. Lee
*Director of the United States Patent and Trademark Office*